(12) United States Patent
Horii

(10) Patent No.: US 7,951,241 B2
(45) Date of Patent: May 31, 2011

(54) CARBON BLACK AQUEOUS DISPERSION AND METHOD OF PRODUCING THE SAME

(75) Inventor: Toshiya Horii, Tokyo (JP)

(73) Assignee: Tokai Carbon Co., Ltd., Tokyo (JP)

( * ) Notice: Subject to any disclaimer, the term of this patent is extended or adjusted under 35 U.S.C. 154(b) by 448 days.

(21) Appl. No.: 11/989,516

(22) PCT Filed: Jun. 27, 2006

(86) PCT No.: PCT/JP2006/313194
§ 371 (c)(1),
(2), (4) Date: Jan. 25, 2008

(87) PCT Pub. No.: WO2007/017999
PCT Pub. Date: Feb. 15, 2007

(65) Prior Publication Data
US 2009/0114119 A1    May 7, 2009

(30) Foreign Application Priority Data

Aug. 9, 2005   (JP) ................................. 2005-230733

(51) Int. Cl.
*C09C 1/44*   (2006.01)
*C09D 11/00*  (2006.01)

(52) U.S. Cl. ..................... 106/478; 106/31.75; 106/31.9; 106/476

(58) Field of Classification Search ............... 106/31.65, 106/31.75, 478, 476; 423/449.5
See application file for complete search history.

(56) References Cited

U.S. PATENT DOCUMENTS 5,846,307 A * 12/1998 Nagasawa et al. ......... 106/31.75
5,861,447 A *  1/1999 Nagasawa et al. ............ 523/161

* cited by examiner

*Primary Examiner* — Anthony J Green
*Assistant Examiner* — Pegah Parvini
(74) *Attorney, Agent, or Firm* — Flynn, Thiel, Boutell & Tanis, P.C.

(57) ABSTRACT

A carbon black aqueous dispersion exhibits excellent dispersibility in an aqueous medium and exhibits excellent rubbing resistance (quick-drying properties), discharge stability, and the like as an aqueous black ink for an inkjet printer or the like. The carbon black aqueous dispersion includes an aqueous medium and carbon black dispersed in the aqueous medium, acidic groups produced on the surface of the carbon black by liquid-phase oxidation being neutralized with a basic amino acid and a basic compound other than the basic amino acid, and hydrogen atoms of the acidic groups being replaced by the basic amino acid and the basic compound. The method of producing the carbon black aqueous dispersion includes subjecting carbon black to liquid-phase oxidation, removing reduced salts from the resulting slurry, neutralizing the carbon black with a basic amino acid and a basic compound other than the basic amino acid to replace hydrogen atoms of acidic groups by the basic amino acid and the basic compound, and purifying the resulting product.

3 Claims, No Drawings

CARBON BLACK AQUEOUS DISPERSION AND METHOD OF PRODUCING THE SAME

TECHNICAL FIELD

The present invention relates to a carbon black aqueous dispersion suitable as an aqueous black ink for inkjet printers and the like, and a method of producing the same.

BACKGROUND ART

Carbon black exhibits hydrophobicity and low wettability with water. Therefore, it is difficult to stably disperse carbon black in water at high concentrations. This is because the surface of carbon black has only a small number of functional groups (e.g. hydrophilic hydrogen-containing functional groups such as a carboxyl group and a hydroxyl group) having a high affinity with water molecules. Various methods have been proposed to improve the dispersibility of carbon black in water by oxidizing the carbon black to produce hydrophilic functional groups on the surface of the carbon black.

For example, JP-A-48-018186 discloses a method which oxidizes carbon black using a hypohalite aqueous solution, and JP-A-57-159856 discloses a method which oxidizes carbon black using a low-temperature oxygen plasma.

A method of producing an aqueous ink has also been proposed in which the dispersibility of moderately oxidized carbon black in water is improved using a coupling agent, a surfactant, or the like (e.g., JP-A-4-189877). However, it is difficult to stably maintain the dispersibility of the carbon black for a long time since the surfactant or the like is oxidized or decomposed due to a change in temperature and a change with time.

JP-A-8-003498 discloses a water-based pigment ink including water and carbon black, wherein the carbon black has a surface active hydrogen content of 1.5 mmol/g or more, and a method of producing a water-based pigment ink including water and carbon black comprising (a) providing acidic carbon black and (b) further oxidizing the acidic carbon black in water using a hypohalite. JP-A-8-319444 discloses a method of producing a water-based pigment ink including finely dispersing carbon black with an oil absorption of 100 ml/100 g or less in an aqueous medium and oxidizing the carbon black using a hypohalite.

According to the methods disclosed in JP-A-8-003498 and JP-A-8-319444, a water-based pigment ink with excellent water-dispersibililty and long-term dispersion stability is obtained by oxidizing carbon black so that the surface of the carbon black has a large number of active hydrogens (i.e. hydrophilic functional group).

On the other hand, the number of hydrophilic functional groups existing at the contact interface between the surface of the carbon black particles and water molecules is important for dispersing the carbon black in water to maintain a stable dispersed state. Therefore, it is difficult to accurately determine the dispersibility of the carbon black merely based on the number of functional groups per unit weight of carbon black. When using a method which finely atomizes carbon black in water using glass beads and oxidizes the carbon black using a hypohalite to treat the surface of the carbon black while improving its dispersibility, the atomization effect is diminished due to the buoyancy applied to the glass beads in water. Moreover, since active sites are rarely formed, it is difficult to uniformly form functional groups on the surface of the carbon black.

JP-A-11-148027 discloses a water-dispersible carbon black which is modified by oxidation and in which the total amount of carboxyl groups and hydroxyl groups among the hydrogen-containing functional groups present on the surface of the carbon black is 3 µeq/m$^2$ or more per unit surface area.

JP-A-9-286938 discloses a water-based pigment ink in which carbon black is oxidized with a hypohalous acid and/or a hypohalite and at least some acidic groups existing on the surface of the oxidized carbon black are bonded to an amine compound to form an ammonium salt.

In JP-A-9-286938, ammonia, a volatile amine replaced by an alkyl group having 1 to 3 carbon atoms, an amine compound replaced by an alkanol group (i.e., alkanolamine or alkylalkanolamine), or the like is used as the amine compound. Since the compounds other than ammonia have a low degree of dissociation, a substitution reaction with hydrogen in the acidic group does not easily occur.

DISCLOSURE OF THE INVENTION

The present invention has been achieved to solve the above problems of the related art. An object of the present invention is to provide a carbon black aqueous dispersion which exhibits an excellent dispersibility in an aqueous medium and exhibits excellent stability, rubbing resistance (quick-drying properties), discharge stability, filterability, and the like and is suitable for an aqueous black ink, such as an inkjet printer ink, and a method of producing the same.

A carbon black aqueous dispersion according to the present invention comprises an aqueous medium and carbon black dispersed in the aqueous medium, acidic groups produced on the surface of the carbon black by liquid-phase oxidation being neutralized with a basic amino acid and a basic compound other than the basic amino acid, and hydrogen atoms of the acidic groups being replaced by the basic amino acid and the basic compound.

A method of producing a carbon black aqueous dispersion comprises subjecting carbon black to liquid-phase oxidation, removing reduced salts from the resulting slurry, neutralizing the carbon black with a basic amino acid and a basic compound other than the basic amino acid to replace hydrogen atoms of acidic groups by the basic amino acid and the basic compound, and purifying the resulting product.

BEST MODE FOR CARRYING OUT THE INVENTION

A carbon black aqueous dispersion according to the present invention comprises an aqueous medium and carbon black dispersed in the aqueous medium, wherein acidic groups (e.g., carboxyl groups and hydroxyl groups) produced on the surface of the carbon black agglomerates by liquid-phase oxidation using an oxidizing agent aqueous solution are neutralized with a basic amino acid and a basic compound other than the basic amino acid, and hydrogen atoms of the acidic groups are replaced by the basic amino acid and the basic compound.

The carbon black subjected to the above surface modification exhibits a significantly improved dispersibility in the aqueous medium. Therefore, an aqueous dispersion containing the carbon black as a pigment exhibits improved dispersion stability, viscosity, filterability, and the like. Accordingly, an ink prepared using the aqueous dispersion has excellent storage stability, rubbing resistance (quick-drying properties), discharge stability, filterability, and the like, and can be suitably used as an aqueous black ink, such as an inkjet printer ink.

The carbon black used in the present invention is not particularly limited. Furnace black, channel black, acetylene black, thermal black, or the like may be used.

The aqueous medium may contain a water-soluble organic solvent in addition to water. It is preferable to use water (particularly deionized water) from the viewpoint of cost and safety.

Examples of the water-soluble organic solvent include water-soluble alcohols such as methanol, ethanol, 1-propanol, and 2-propanol, water-soluble ethers such as diethylene glycol dimethyl ether and diethylene glycol diethyl ether, water-soluble ketones such as acetone, water-soluble fatty acids such as formic acid, acetic acid, propionic acid, and butyric acid, water-soluble nitrogen compounds such as N,N-dimethylformamide and N-methylpyrrolidone, water-soluble sulfur compounds such as dimethylsulfoxide, and the like. The water-soluble organic solvent is not particularly limited insofar as the organic solvent is soluble in water.

The carbon black aqueous dispersion is produced by subjecting carbon black to liquid-phase oxidation, removing reduced salts from the resulting slurry, neutralizing the carbon black with a basic amino acid and a basic compound other than the basic amino acid to replace hydrogen atoms of acidic groups by the basic amino acid and the basic compound, and purifying the resulting product.

The carbon black is subjected to liquid-phase oxidation by mixing the carbon black into an aqueous solution of an oxidizing agent such as nitric acid, sulfuric acid, chlorate, persulfate, perborate, or percarbonate and stirring the mixture. The degree of liquid-phase oxidation is adjusted by changing the oxidizing agent concentration in the oxidizing agent aqueous solution, the amount of carbon black added to the oxidizing agent aqueous solution, the oxidation temperature, the oxidation time, the stirring speed, and the like.

For example, the carbon black is mixed into the oxidizing agent aqueous solution of which the concentration has been adjusted at an appropriate quantitative ratio, and the mixture is stirred at approximately room temperature to 90° C., and preferably 60 to 90° C. to form a slurry. The carbon black is oxidized in the slurry. The degree of oxidation is preferably adjusted so that the pH of the carbon black after oxidation is 3.0 or less.

Hydrophilic acidic groups such as carboxyl groups and hydroxyl groups are produced on the surface of the carbon black due to oxidation. In this case, the carbon black can be efficiently dispersed in the oxidizing agent aqueous solution by subjecting the carbon black to wet or dry oxidation in advance, whereby the carbon black can be uniformly and efficiently subjected to liquid-phase oxidation. Wet oxidation is performed using ozone water, a hydrogen peroxide aqueous solution, persulfuric acid, or a persulfate. Dry oxidation is performed by exposing the carbon black to a gas atmosphere such as ozone, oxygen, $NO_X$, or $SO_X$.

It is also preferable to add a surfactant to the oxidizing agent aqueous solution so that the carbon black is uniformly dispersed in the oxidizing agent aqueous solution. As the surfactant, an anionic, nonionic, or cationic surfactant may be used.

The acidic groups such as carboxyl groups and hydroxyl groups produced on the surface of the carbon black due to liquid-phase oxidation are neutralized. A neutralization reaction proceeds smoothly and efficiently by removing reduced salts produced in the slurry due to liquid-phase oxidation before neutralization. Reduced salts may be removed using a separation membrane such as an ultrafilter (UF) membrane, a reverse osmosis (RO) membrane, or an electrodialysis membrane.

The slurry from which reduced salts have been removed is neutralized with a basic amino acid and a basic compound other than the basic amino acid. The slurry may be neutralized at room temperature. It is preferable to neutralize the slurry with stirring at room temperature to 100° C. for 3 to 20 hours while adjusting the pH to 4.0 to 12.0 so that the neutralization reaction proceeds smoothly.

As the basic amino acid, arginine, ornithine, lysine, histidine, and their derivatives in which an alkyl group is replaced by a substituent are preferable. Of these, arginine and lysine are particularly preferable. Examples of the substituent include a substituted or unsubstituted alkyl group, a hydroxyl group, a phenyl group, a halogen atom, and the like. Examples of the basic compound other than the basic amino acid include an alkali metal hydroxide, ammonia, an alkali metal hydrogen carbonate, a tetraalkylammonium hydroxide, and the like.

Hydrogen atoms of the acidic groups on the surface of the carbon black are replaced by the basic amino acid and the basic compound as a result of neutralization. It is preferable that 5 to 95% of hydrogen atoms of the acidic groups be replaced by the basic amino acid and the remaining hydrogen atoms be replaced by the basic compound other than the basic amino acid.

The order of neutralization/substitution is not particularly limited. Examples of the neutralization/substitution method include (1) some of the acidic groups are neutralized with the basic amino acid, and the remaining acidic groups are then neutralized with the basic compound other than the basic amino acid, (2) some of the acidic groups are neutralized with the basic compound other than the basic amino acid, and the remaining acidic groups are then neutralized with the basic amino acid, (3) the acidic groups are neutralized with a solution prepared by mixing the basic amino acid and the basic compound other than the basic amino acid, and the like.

Salts which have been produced by neutralization and hinder the dispersibility of the carbon black in water are removed by purification. Removal of salts is also effective for preventing the carbon black from re-aggregating in the slurry. Reduced salts are removed by purification using a separation membrane such as an ultrafilter (UF) membrane, a reverse osmosis (RO) membrane, or an electrodialysis membrane. Purification is performed until the conductivity of the slurry decreases to 5 mS/cm or less when the carbon black content is 20 wt %, for example.

Large undispersed clusters and coarse particles may exist in the carbon black aqueous dispersion thus purified and may cause clogging of a nozzle when using the carbon black aqueous dispersion as an inkjet printer ink, for example. Therefore, large undispersed clusters and coarse particles are preferably classified and removed by centrifugation, filtration, or the like.

It is preferable to atomize the carbon black agglomerates in the carbon black aqueous dispersion which has been purified and optionally classified. The carbon black agglomerates are atomized by spraying the slurry at a high speed from a nozzle under pressure so that collisions occur between the sprayed streams or between the sprayed streams and a wall surface. The carbon black agglomerates in the slurry are atomized by collision, a shear force during spraying, and the like.

Various commercially-available atomizers may be used as an atomizing means. Examples of such atomizers include Microfluidizer (manufactured by Microfluidics Corporation), Ultimizer (manufactured by Sugino Machine Limited), Nanomizer (manufactured by Tokai Corporation), a high-pressure homogenizer, and the like. The carbon black agglomerates are preferably atomized so that the maximum particle diameter of the agglomerates becomes 1 μm or less by spraying the slurry from a spray nozzle under a pressure of 50 to 250 MPa, for example.

The above classification and atomization may be performed after neutralization (i.e., replacing hydrogen atoms of the acidic groups on the surface of the carbon black by the basic amino acid and the basic compound other than the basic amino acid), but before purification.

A carbon black aqueous dispersion in which the carbon black is finely dispersed in the aqueous medium is thus produced. The carbon black aqueous dispersion may be further purified and concentrated depending on the application to produce an aqueous black ink used for an inkjet printer or the like.

Specifically, an aqueous black ink is prepared by adding or removing the aqueous medium to adjust the carbon black concentration to an appropriate concentration (e.g., 0.1 to 20 wt %), and optionally adding commonly-used ink additives such as an antiseptic agent, a viscosity regulator, and a resin.

EXAMPLES

The present invention is described below by way of examples and comparative examples. Note that the following examples illustrate one aspect of the present invention, and should not be construed as limiting the present invention.

Example 1

150 g of carbon black (Seast 9 manufactured by Tokai Carbon Co., Ltd.) was added to 3000 ml of a 2.0 N ammonium persulfate solution. The mixture was then subjected to liquid-phase oxidation at 60° C. for 10 hours with stirring (300 rpm). After removing reduced salts from the slurry using an ultrafilter membrane (AHP-1010 manufactured using Asahi Kasei Corporation; molecular weight cutoff: 50,000), oxidized carbon black was filtered off. The carboxyl group content and the hydroxyl group content of the oxidized carbon black were measured using the following methods. The carboxyl group content was 450 μmol/g, and the hydroxyl group content was 250 μmol/g.
(1) Measurement of carboxyl group content: About 2 to 5 g of the oxidized carbon black was added to a 0.976 N sodium hydrogen carbonate aqueous solution. The mixture was shaken for about six hours and then filtered. The carboxyl group content in the filtrate was measured by titration.
(2) Measurement of hydroxyl group content: 2,2'-diphenyl-1-picrylhydrazyl (DPPH) was dissolved in carbon tetrachloride to prepare a $5 \times 10^{-4}$ mol/l solution. 0.1 to 0.6 g of the oxidized carbon black was added to the solution. The mixture was stirred in a thermostat bath at 60° C. for six hours and then filtered. The filtrate was measured using an ultraviolet absorptiometer, and the hydroxyl group content was calculated from the absorbance.

A 0.5 N L-arginine solution was added to the oxidized carbon black so that 50% (350 μmol/g) of the acidic groups were replaced by L-arginine, and the mixture was reacted at 97° C. for three hours with stirring (300 rpm). A 0.5 N sodium hydroxide aqueous solution was then added to the mixture so that the remaining acidic groups (350 μmol/g) were replaced by sodium hydroxide, and the mixture was reacted at 97° C. for three hours with stirring (300 rpm).

After neutralization, the remaining salts were separated from the carbon black dispersion by purification using an ultrafilter membrane (AHP-1010 manufactured by Asahi Kasei Corporation; molecular weight cutoff: 50,000). The resulting product was then concentrated to produce a carbon black aqueous dispersion (carbon black concentration: 15 wt %). The conductivity of the aqueous dispersion was 0.6 mS/cm.

Example 2

A carbon black aqueous dispersion was produced in the same manner as in Example 1 except for using L-lysine instead of L-arginine.

Example 3

A carbon black aqueous dispersion was produced in the same manner as in Example 1 except for using an ammonia aqueous solution instead of the sodium hydroxide aqueous solution.

Example 4

A carbon black aqueous dispersion was produced in the same manner as in Example 1 except for adding the sodium hydroxide aqueous solution and the L-arginine solution in that order.

Comparative Example 1

A carbon black aqueous dispersion was produced in the same manner as in Example 1 except for neutralizing the oxidized carbon black using only the sodium hydroxide aqueous solution without using the L-arginine solution.

Comparative Example 2

A carbon black aqueous dispersion was produced in the same manner as in Example 1 except for using a butylamine aqueous solution instead of the L-arginine solution and the sodium hydroxide aqueous solution.

Comparative Example 3

A carbon black aqueous dispersion was produced in the same manner as in Example 1 except for neutralizing the oxidized carbon black using only the L-arginine solution without using the sodium hydroxide aqueous solution.

The carbon black concentration of each carbon black aqueous dispersion was adjusted to 20 wt %. The dispersibility of the carbon black was evaluated using the following methods. The evaluation results are shown in Table 1.
Viscosity: A sample was placed in an airtight container and kept at 70° C. The viscosity of the sample was measured after 1 to 4 weeks using a rotational vibration type viscometer (VM-100-L manufactured by Yamaichi Electronics Co., Ltd.). The dispersion stability of the carbon black during heating was evaluated based on the change in viscosity.
Particle diameter of carbon black agglomerate: The carbon black concentration of each sample of which the viscosity was measured was adjusted to 0.1 to 0.5 kg/cm$^3$. The particle diameters of the carbon black agglomerates were measured using a heterodyne laser Doppler particle size distribution measurement device (UPA model 9340 manufactured by Microtrac Inc.), and a cumulative frequency distribution curve was created. A value corresponding to a cumulative percentage of 99% was determined to be the maximum particle diameter (Dupa 99%) of the carbon black agglomerates, and a value corresponding to a cumulative percentage of 50% was determined to be the average particle diameter (Dupa 50%) of the carbon black agglomerates. A change in the particle diameters of the carbon black agglomerates with time was thus determined.

Filterability: 200 g of a sample was subjected to a filtration test using a No. 2 filter paper (diameter: 90) or a membrane filter having a pore size of 0.8 μm, 0.65 μm, or 0.45 μm under a reduced pressure of 20 torr. The amount of the sample filtered was measured.

TABLE 1

|  | Example | | | | Comparative Example | | |
| --- | --- | --- | --- | --- | --- | --- | --- |
|  | 1 | 2 | 3 | 4 | 1 | 2 | 3 |
| Viscosity (cp) | | | | | | | |
| Initial | 3.86 | 3.91 | 4.10 | 5.08 | 4.84 | 4.39 | 4.45 |
| 70° C., after 1 week | 3.82 | 3.90 | 4.08 | 5.07 | 4.91 | Gelled | 4.48 |
| 70° C., after 2 weeks | 3.78 | 3.88 | 4.05 | 5.01 | 4.96 | — | 4.47 |
| 70° C., after 3 weeks | 3.77 | 3.88 | 4.01 | 4.98 | 5.01 | — | 4.50 |
| 70° C., after 4 weeks | 3.73 | 3.87 | 4.01 | 4.95 | 5.04 | — | 4.55 |
| Average particle diameter (Dupa50%) (nm) | | | | | | | |
| Initial | 155.9 | 156.8 | 150.7 | 146.8 | 158.4 | 154.7 | 155.9 |
| 70° C., after 1 week | 148.9 | 151.0 | 149.8 | 146.9 | 159.2 | Gelled | 166.3 |
| 70° C., after 2 weeks | 148.0 | 151.6 | 149.7 | 146.7 | 159.4 | — | 169.8 |
| 70° C., after 3 weeks | 148.5 | 150.1 | 150.3 | 146.5 | 159.9 | — | 170.2 |
| 70° C., after 4 weeks | 148.3 | 149.6 | 150.1 | 146.5 | 160.1 | — | 170.5 |
| Maximum particle diameter (Dupa99%) (nm) | | | | | | | |
| Initial | 323.5 | 342.9 | 378.2 | 349.5 | 342.1 | 360.0 | 340.8 |
| 70° C., after 1 week | 324.5 | 335.4 | 377.8 | 349.4 | 342.4 | Gelled | 381.1 |
| 70° C., after 2 weeks | 323.3 | 334.0 | 377.0 | 349.1 | 343.5 | — | 395.1 |
| 70° C., after 3 weeks | 325.0 | 333.8 | 377.0 | 349.0 | 344.7 | — | 395.2 |
| 70° C., after 4 weeks | 324.2 | 332.1 | 376.8 | 349.0 | 345.3 | — | 396.9 |
| Filterability (%) | | | | | | | |
| No. 2 filter paper | 100 | 100 | 100 | 100 | 100 | 100 | 100 |
| 0.80 μm | 100 | 100 | 100 | 100 | 100 | 80 | 100 |
| 0.65 μm | 100 | 100 | 100 | 100 | 50 | 0 | 80 |
| 0.45 μm | 35 | 35 | 35 | 35 | 0 | 0 | 20 |

An inkjet recording ink was prepared by mixing 33.3% of the carbon black aqueous dispersion (carbon black concentration: 15 wt %) obtained in each of Examples 1 to 4 and Comparative Examples 1 to 3, 20.0% of a water-soluble organic solvent (glycerol), 0.2% of a surfactant (Emulgen 106 manufactured by Kao Corporation), 0.2% of an amine compound (triisopropanolamine), and 41.3% of deionized water (ultrapure water). The feathering properties, the rubbing resistance (quick-drying properties), the discharge performance, and the metal corrosiveness of the inkjet recording ink were evaluated using the following methods. The evaluation results are shown in Table 2.

Feathering properties: Alphanumeric characters were printed on a Xerox 4200 paper using a printer MFC-3100C (manufactured by Brother Industries, Ltd.). After allowing the paper to stand for one hour or more, the clarity of the characters and feathering occurring from the characters were observed using a microscope and with the naked eye to evaluate the effects of the ink on the image according to the following standard.
Excellent: Clear printing with almost no feathering
Good: Clear printing with no significant feathering
Poor: Unclear printing with rather significant feathering
Very poor: Unclear printing with significant feathering
Rubbing resistance (quick-drying properties): Alphanumeric characters were printed on a Xerox 4200 paper using a printer MFC-3100C (manufactured by Brother Industries, Ltd.). After allowing the paper to stand for a specific period of time, unprinted paper of the same type was placed on the printed paper. After placing a flat weight (100 g) on the paper, the printed paper was quickly pulled out. The period of time required for the characters to be fixed on the printed paper was measured, and evaluated according to the following standard.
Excellent: 10 seconds or less
Good: 11 to 15 seconds
Poor: 16 to 20 seconds
Very poor: 21 seconds or more
Discharge performance: Printing was performed using a printer MFC-3100C (manufactured by Brother Industries, Ltd.) to check the discharge stability and the discharge response of the ink. The discharge stability was checked by discharging the carbon black aqueous dispersion for 24 hours at temperatures of 5° C., 20° C., and 40° C. The discharge response was checked by performing one-minute intermittent discharges 100 times and checking whether or not the ink could be discharged after two months. A case where the ink could be normally discharged during discharge stability checking and discharge response checking and did not cause the inkjet head to be clogged was evaluated as "Good." Otherwise, the ink was evaluated as "Very poor".
Metal corrosiveness: A piece of an iron-nickel alloy used as a raw material for a metal member provided in an ink supply path was immersed in the ink at 60° C. for two hours. The surface of the alloy piece was observed with the naked eye before and after immersion to evaluate the degree of corrosion.
Good: The surface of the alloy piece was not corroded or was discolored to some extent
Very poor: The surface of the alloy piece was corroded

TABLE 2

| | Example | | | | Comparative | | |
|---|---|---|---|---|---|---|---|
| | 1 | 2 | 3 | 4 | 1 | 2 | 3 |
| Feathering | Excellent | Excellent | Excellent | Excellent | Poor | Poor | Good |
| Rubbing resistance (quick-drying properties) | Excellent | Excellent | Excellent | Excellent | Very poor | Very poor | Good |
| Discharge performance | Good | Good | Good | Good | Good | Very poor | Good |
| Metal corrosiveness | Good | Good | Good | Good | Good | Good | Good |

As is clear from Tables 1 and 2, the carbon black aqueous dispersions according to the examples exhibited stable dispersibility as compared with the carbon black aqueous dispersions according to the comparative examples. The inks prepared using the aqueous dispersions according to the examples exhibited excellent feathering properties, friction resistance, and discharge performance. Therefore, it was confirmed that these inks are suitable as an aqueous black ink for an inkjet printer or the like.

INDUSTRIAL APPLICABILITY

The carbon black aqueous dispersion according to the present invention exhibits an excellent dispersibility in an aqueous medium. The ink prepared using the aqueous dispersions according to the present invention exhibits an excellent rubbing resistance (quick-drying properties), discharge performance, and the like. Therefore, the ink can be suitably used as an aqueous black ink for an inkjet printer or the like.

The invention claimed is:

1. A carbon black aqueous dispersion comprising an aqueous medium and carbon black having hydrogen atoms of acidic groups provided thereon replaced with a basic amino acid and a basic compound other than the basic amino acid by neutralization with a basic amino acid selected from the group consisting of arginine and lysine and a basic compound selected from the group consisting of an alkali metal hydroxide, ammonia, an alkali metal carbonate and a tetraalkylammonium hydroxide.

2. The carbon black aqueous dispersion of claim 1, wherein 5-95% of the hydrogen atoms of the acidic groups are replaced by the basic amino acid and the remaining hydrogen atoms of the acidic groups are replaced by the other basic compound.

3. The carbon black aqueous dispersion of claim 1, wherein the basic amino acid is L-arginine and the other basic compound is sodium hydroxide.

* * * * *